United States Patent
Lee

(10) Patent No.: US 7,300,320 B2
(45) Date of Patent: Nov. 27, 2007

(54) CONDUCTIVE ELASTIC COMPONENT FOR ELECTRICALLY CONNECTING AN ELECTRONIC DEVICE WITH A CRADLE

(75) Inventor: Hsin-Chu Lee, Taipei (TW)

(73) Assignee: Lite-On Technology Corp., Neihu, Taipei (TW)

( * ) Notice: Subject to any disclaimer, the term of this patent is extended or adjusted under 35 U.S.C. 154(b) by 0 days.

(21) Appl. No.: 11/277,615

(22) Filed: Mar. 28, 2006

(65) Prior Publication Data
US 2007/0238369 A1  Oct. 11, 2007

(51) Int. Cl.
*H01R 4/48* (2006.01)
(52) U.S. Cl. .......................... 439/862; 439/885
(58) Field of Classification Search ............... 439/862, 439/885, 929; 320/113, 115
See application file for complete search history.

(56) References Cited

U.S. PATENT DOCUMENTS

| | | | |
|---|---|---|---|
| 6,315,621 B1 * | 11/2001 | Natori et al. ............... | 439/862 |
| 6,464,512 B2 * | 10/2002 | Morita ........................ | 439/66 |
| 6,623,316 B1 * | 9/2003 | Wu ............................. | 439/862 |
| 6,875,049 B2 * | 4/2005 | Kyowski et al. ............ | 439/500 |
| 7,112,072 B2 * | 9/2006 | Korsunsky et al. ......... | 439/108 |
| 7,156,705 B2 * | 1/2007 | Soh ............................. | 439/862 |
| 2003/0104731 A1 * | 6/2003 | Chang ........................ | 439/862 |

* cited by examiner

*Primary Examiner*—Thanh-Tam Le
(74) *Attorney, Agent, or Firm*—Winston Hsu

(57) ABSTRACT

A conductive elastic component for electrically connecting an electronic device with a cradle includes a plurality of fingers, a first metallic plate connecting first ends of the plurality of fingers, and a second metallic plate connecting second ends of the plurality of fingers. Each finger has a first end for being mechanically connected to the cradle, a first segment spanning between the first end and a first point, and a second segment spanning between the first point and a second end. The second segment of each finger has a curved contact region for contacting the input node of the electronic device. An angle between a line connecting the first point and the first end and a line connecting the first point and the second end is an acute angle. In addition, the centerline along the lengths of the first and second segments resides in a same plane.

9 Claims, 11 Drawing Sheets

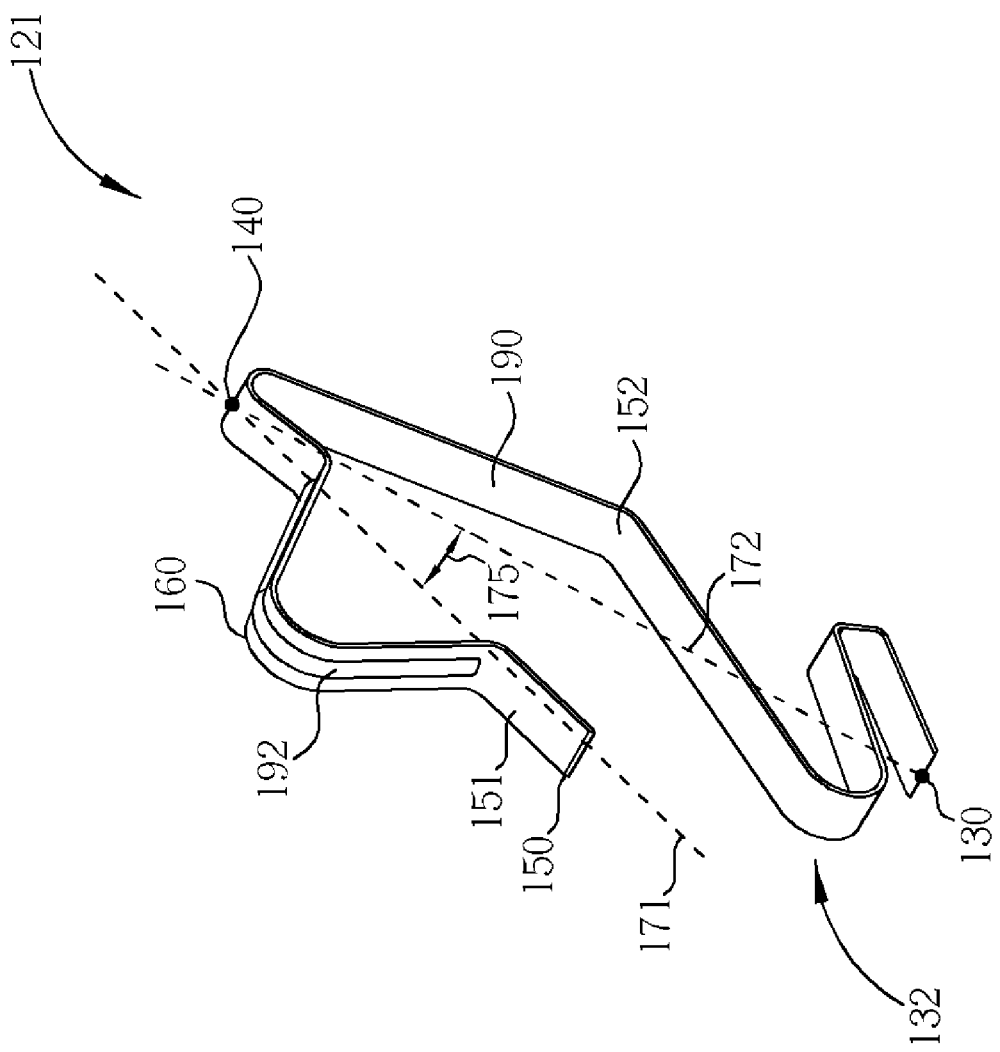

CONDUCTIVE ELASTIC COMPONENT FOR ELECTRICALLY CONNECTING AN ELECTRONIC DEVICE WITH A CRADLE

BACKGROUND OF THE INVENTION

1. Field of the Invention

The present invention relates to a conductive elastic component, and more specifically, to a conductive elastic component for electrically connecting an electronic device with a cradle.

2. Description of the Prior Art

As portable devices are getting more popular, more people use cradles to charge their portable devices or to connect their portable devices with computers. Users can easily place such a device onto a cradle, alleviating the need to plug connectors into the small sockets of such a device.

Originally, portable devices were placed in and taken out of cradles vertically. Recently, portable devices have become well designed in their appearance to attract consumers. This has led to a lounge-shaped cradle, in which a portable device is able to be placed on and removed from in any direction. Consequently, the elastic conductive components adopted in traditional cradles for electrically connecting to portable devices have become unsuitable for the new models of cradles since they can become stuck when a device is placed in a cradle in a certain manner (i.e., from an odd direction).

Furthermore, these elastic components often need to be transported before being securely fixed in the cradles. Thus, such elastic components can be deformed during transportation.

SUMMARY OF THE INVENTION

A claimed conductive elastic component for electrically connecting an electronic device with a cradle comprises a plurality of fingers, a first metallic plate connecting first ends of the plurality of fingers, and a second metallic plate connecting second ends of the plurality of fingers.

Another claimed conductive finger for electrically connecting an input node of an electronic device with an input node of a cradle comprises a first end for being mechanically connected to the cradle, a first segment spanning between the first end and a first point, and a second segment spanning between the first point and a second end. The second segment has a curved contact region for contacting the input node of the electronic device. An angle between a line connecting the first point and the first end and a line connecting the first point and the second end is an acute angle. A concave side of the curved contact region faces the first segment. Centerlines along the lengths of the first and second segments reside in a same plane.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2A and 2B show an embodiment of a finger of a conductive elastic component according to the present invention.

DETAILED DESCRIPTION

Figure 1:
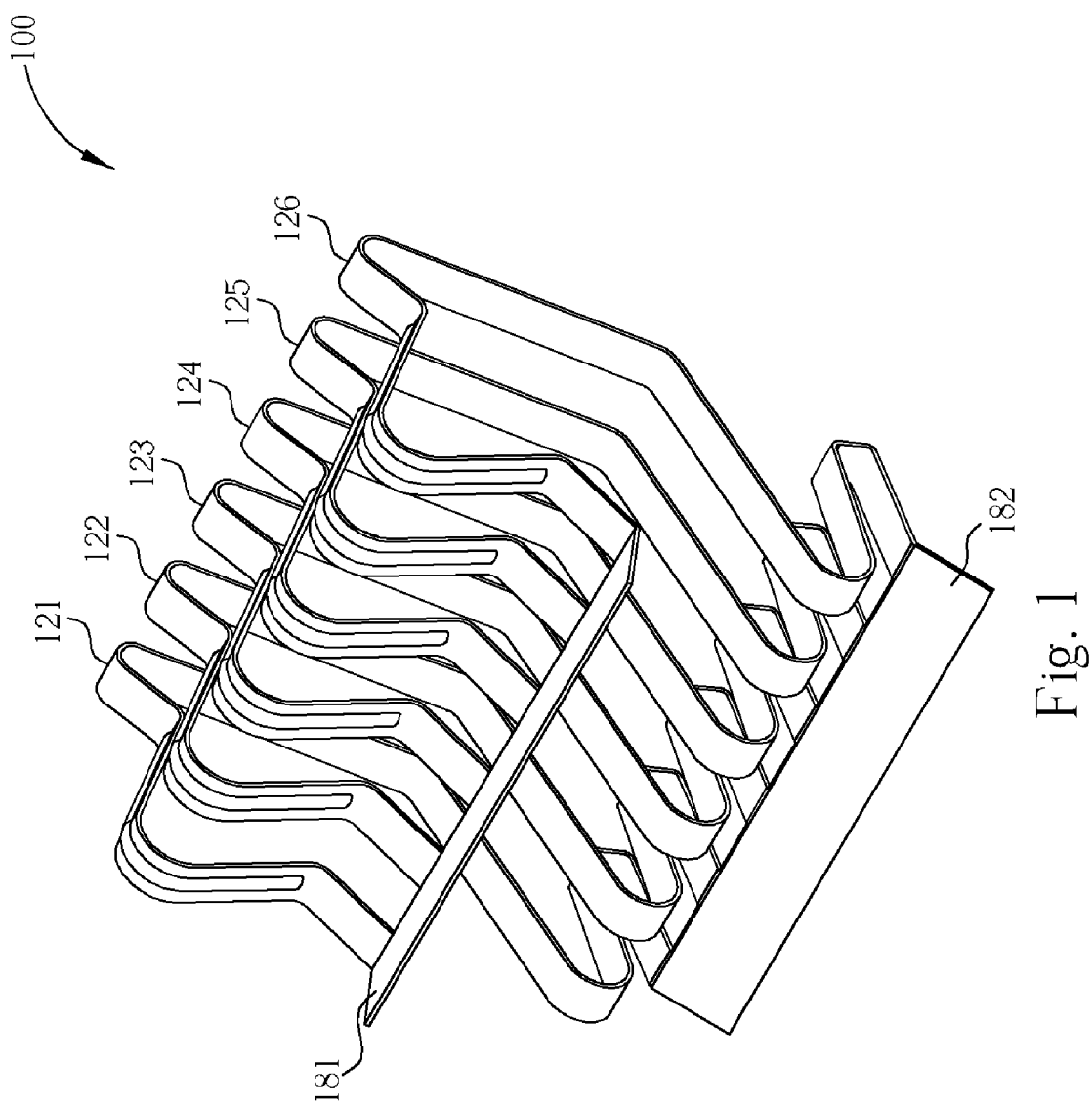
FIG. 1 shows an embodiment of a conductive elastic component according to the present invention.

Please refer to FIG. 1. FIG. 1 shows an embodiment of the present invention. A conductive elastic component 100 for electrically connecting an electronic device with a cradle comprises a plurality of fingers 121-126, a metallic plate 182 connecting first ends of the plurality of fingers 121-126, and a metallic plate 181 connecting second ends of the plurality of fingers 121-126. The number of fingers shown in FIG. 1 is only an example and not limited to being six.

Figure 2B:
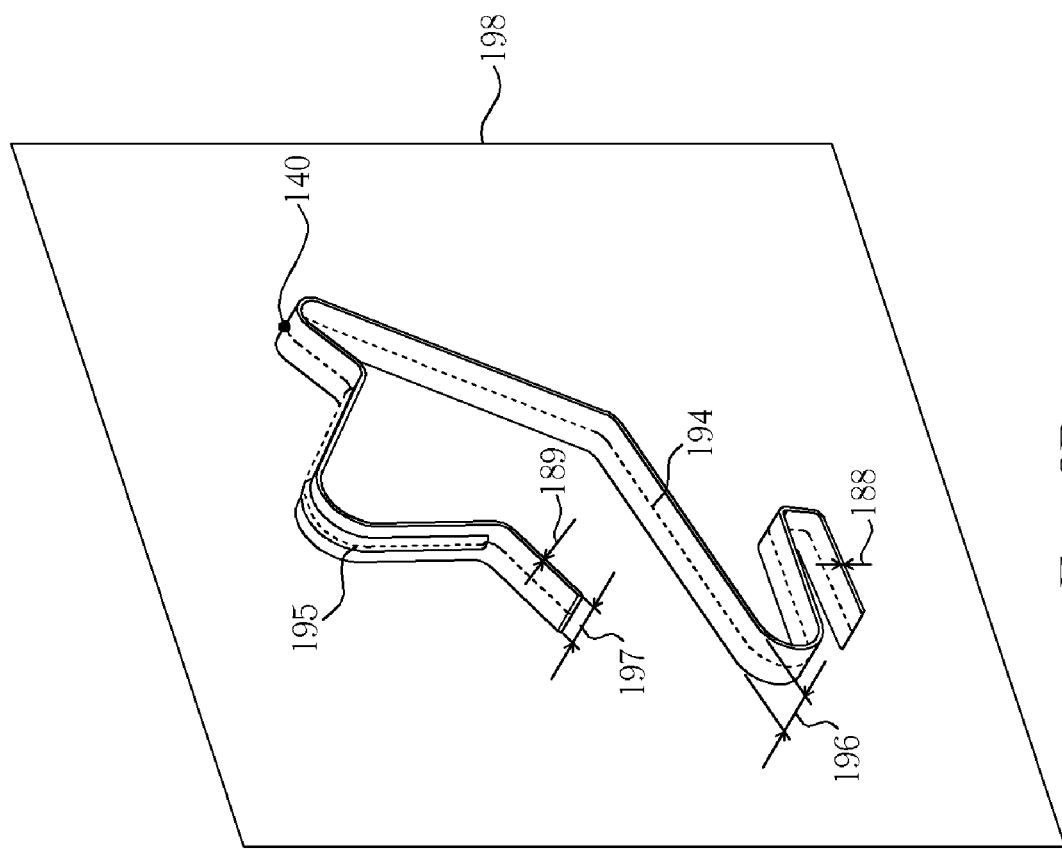

Please refer to FIGS. 2A and 2B. FIGS. 2A and 2B show one finger 121 of the present invention for simplicity, the other fingers 122-126 possessing the same characteristics as the finger 121. The finger 121 comprises a first end 130 for being mechanically connected to the cradle, a first segment 190 between the first end 130 and a first point 140, and a second segment 192 between the first point 140 and a second end 150. The first segment 190 comprises an S-bend 132, and a bend 152 between the S-bend 132 and the first point 140. The bend 152 is of an obtuse angle. The second segment 192 has a curved contact region 160 for electrically connecting to an input node of an electronic device set in the cradle. The concave side of the curved contact region 160 faces the first segment 190. The second segment 192 further comprises a flat portion 151 between the second end 150 and the curved contact region 160 for resting against an interior surface of the cradle. An angle 175 between a line 172 connecting the first end 130 and the first point 140 and a line 171 connecting the second end 150 and the first point 140 is preferably but not limited to between 15 and 45 degrees, that is, the second segment 192 is folded back towards the first segment 190. The first and second segments 190, 192 of the finger 121 have centerlines 194, 195 that reside in the same plane 198 and have widths 196, 197 substantially perpendicular to the plane 198 and thicknesses 188, 189 substantially perpendicular to their respective widths 196, 197, i.e., they are ribbon-like in shape. The width-to-thickness ratio of the first and second segments 190, 192 is preferably but not limited to greater than 10 to 1. For electrical conductive purposes, the fingers 121-126 can be made of metal.

Figure 3:
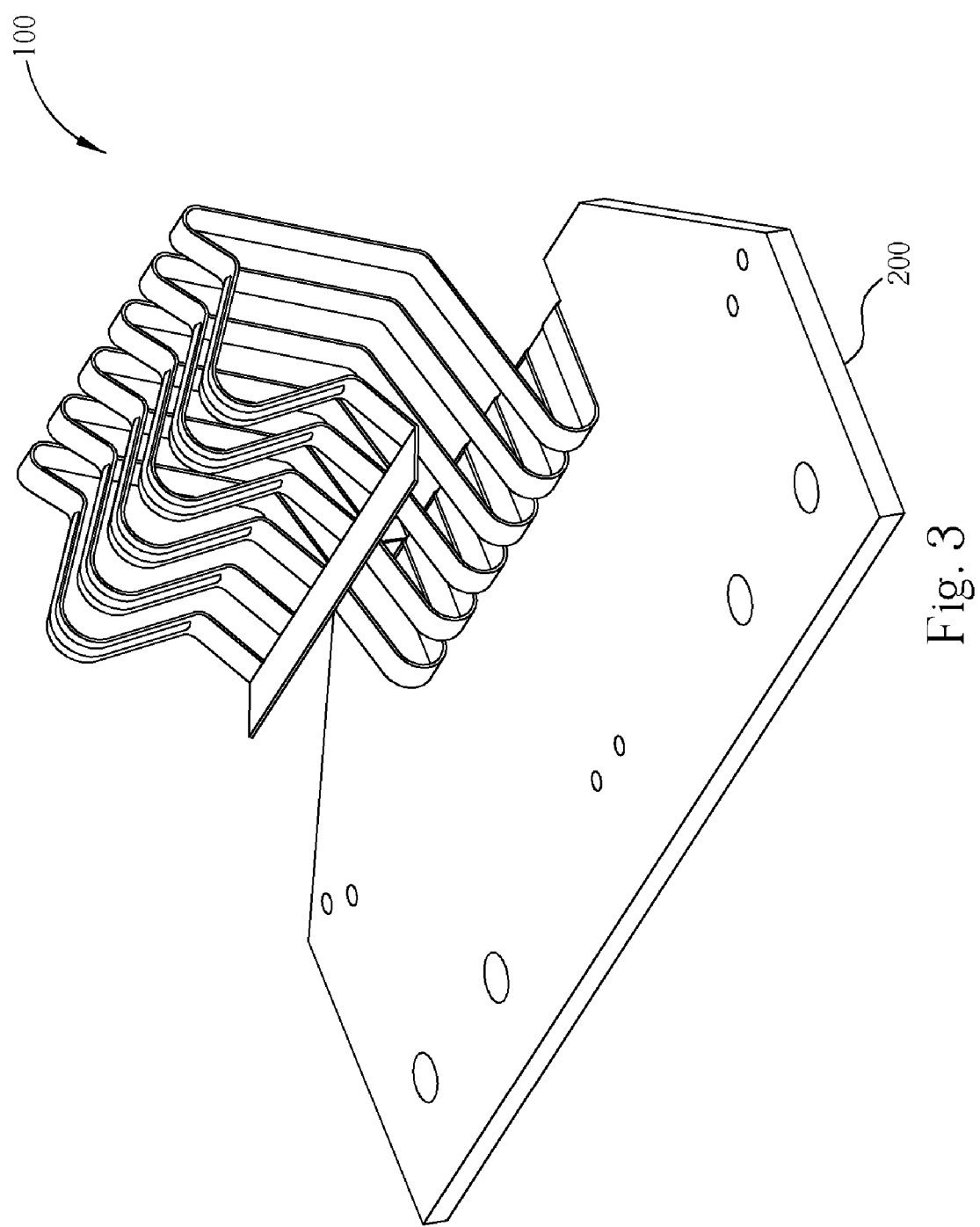
FIG. 3 shows the elastic component of FIG. 1 attached to a circuit board.
Figure 4:
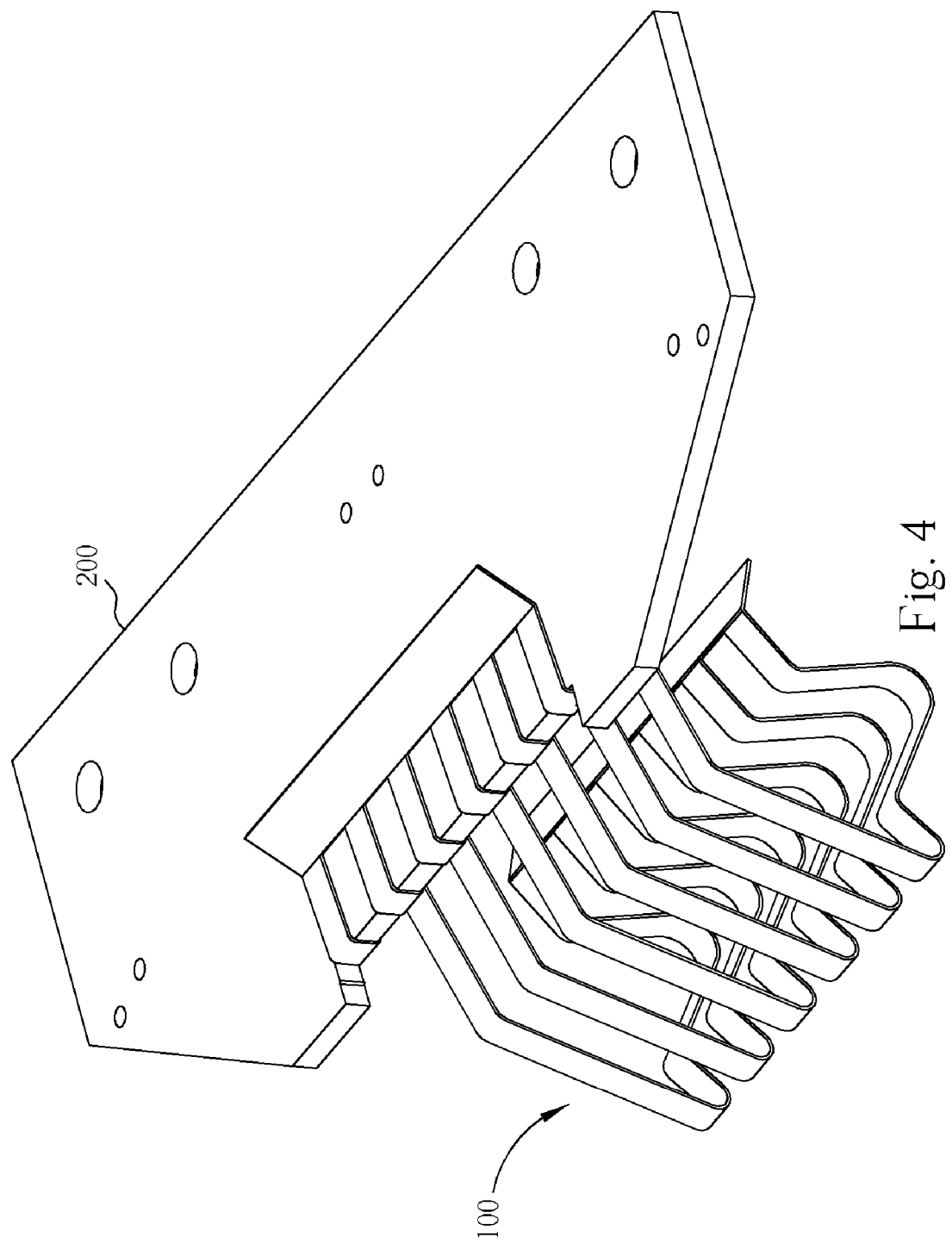
FIG. 4 shows the elastic component of FIG. 1 attached to a circuit board from an underside of the circuit board.
Figure 5:
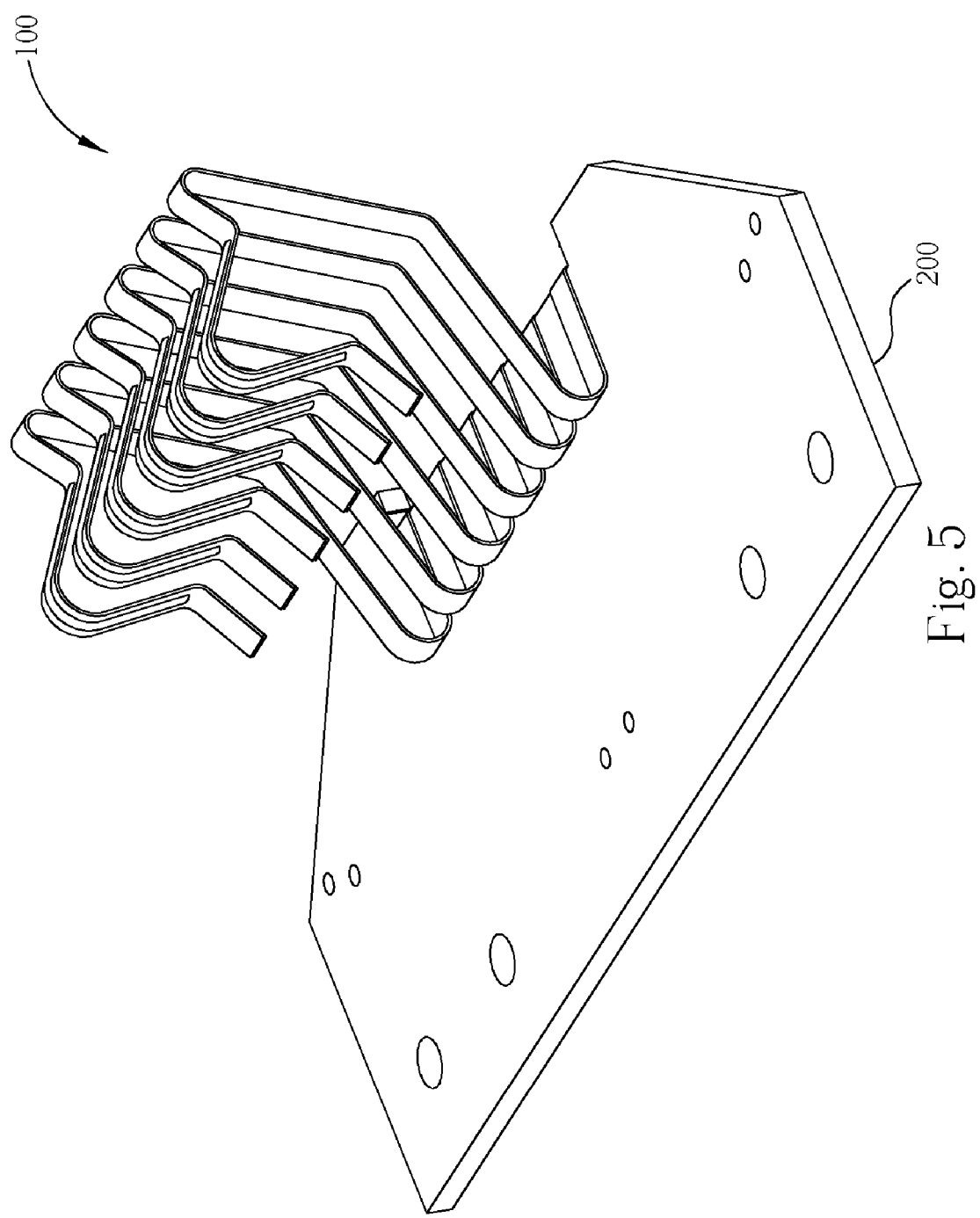
FIG. 5 shows metallic plates removed from the elastic component of FIG. 1.

Please refer to FIG. 3 and FIG. 4. FIG. 3 shows the elastic component 100 fixed and electrically connected to a circuit board 200 of a cradle by way of the lower halves of the first segments 190 of the fingers 121-126. FIG. 4 shows the elastic component 100 fixed and electrically connected to a circuit board 200 of a cradle from an under side of the circuit board 200. Please refer to FIG. 1, FIG. 5, and FIG. 6. In FIG.

Figure 6:
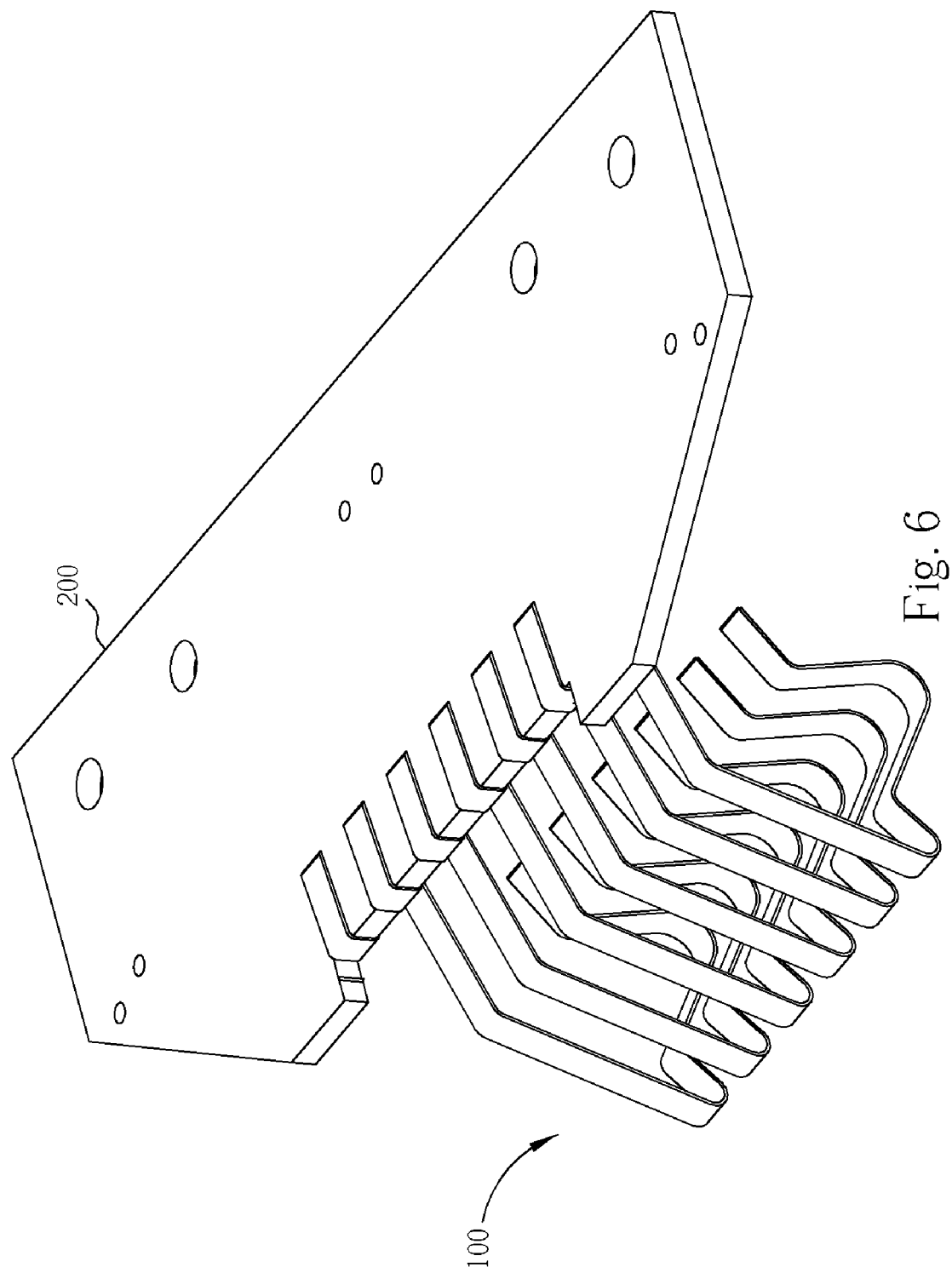
FIG. 6 shows metallic plates removed from the elastic component of FIG. 1 from the underside of the circuit board.

5, the plates 181 and 182 are removed from the fingers 121-126 so that the fingers 121-126 are electrically isolated from each other. FIG. 6 shows the plates 181 and 182 removed from the fingers 121-126 from the underside of the circuit board 200. The purpose of the removable plates 181 and 182 is that the elastic component 100 does not undergo deformation during transportation, when multitude of elastic components 100 might be shipped loose in a box.

Figure 7:
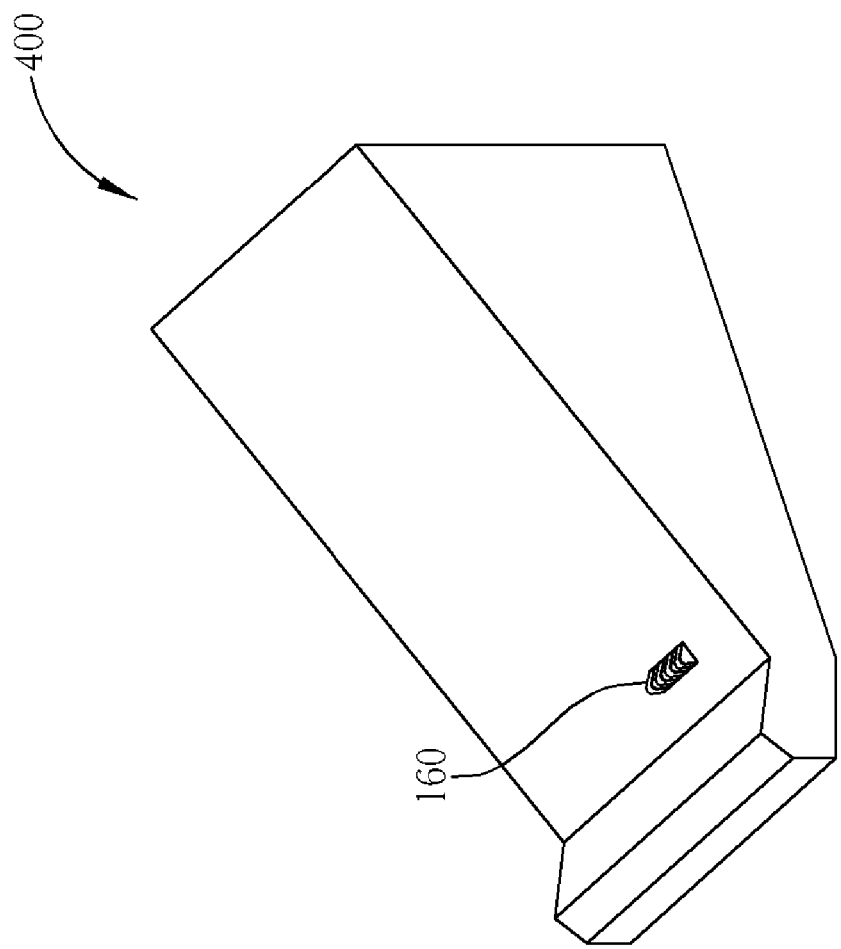
FIG. 7 shows the elastic component of FIG. 1 located in a cradle.
Figure 8:
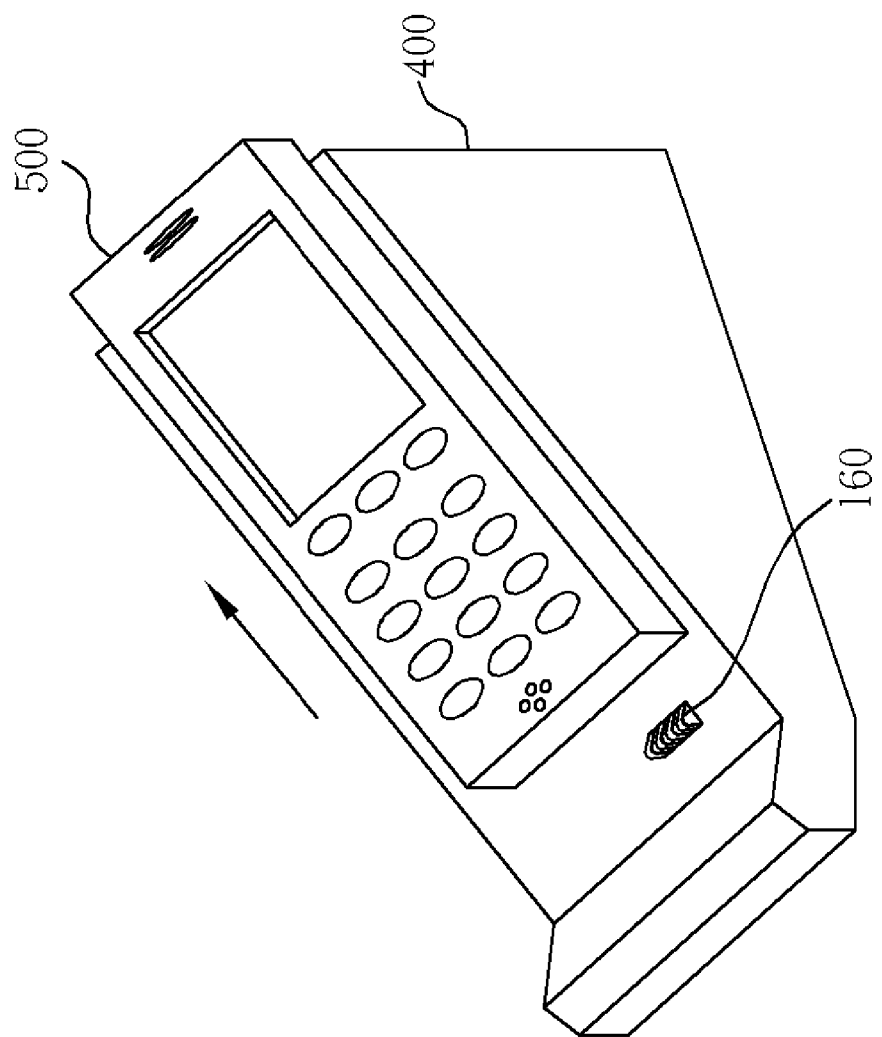
FIG. 8 shows an electronic device being moved upward along a surface of a cradle according to the present invention.
Figure 9:
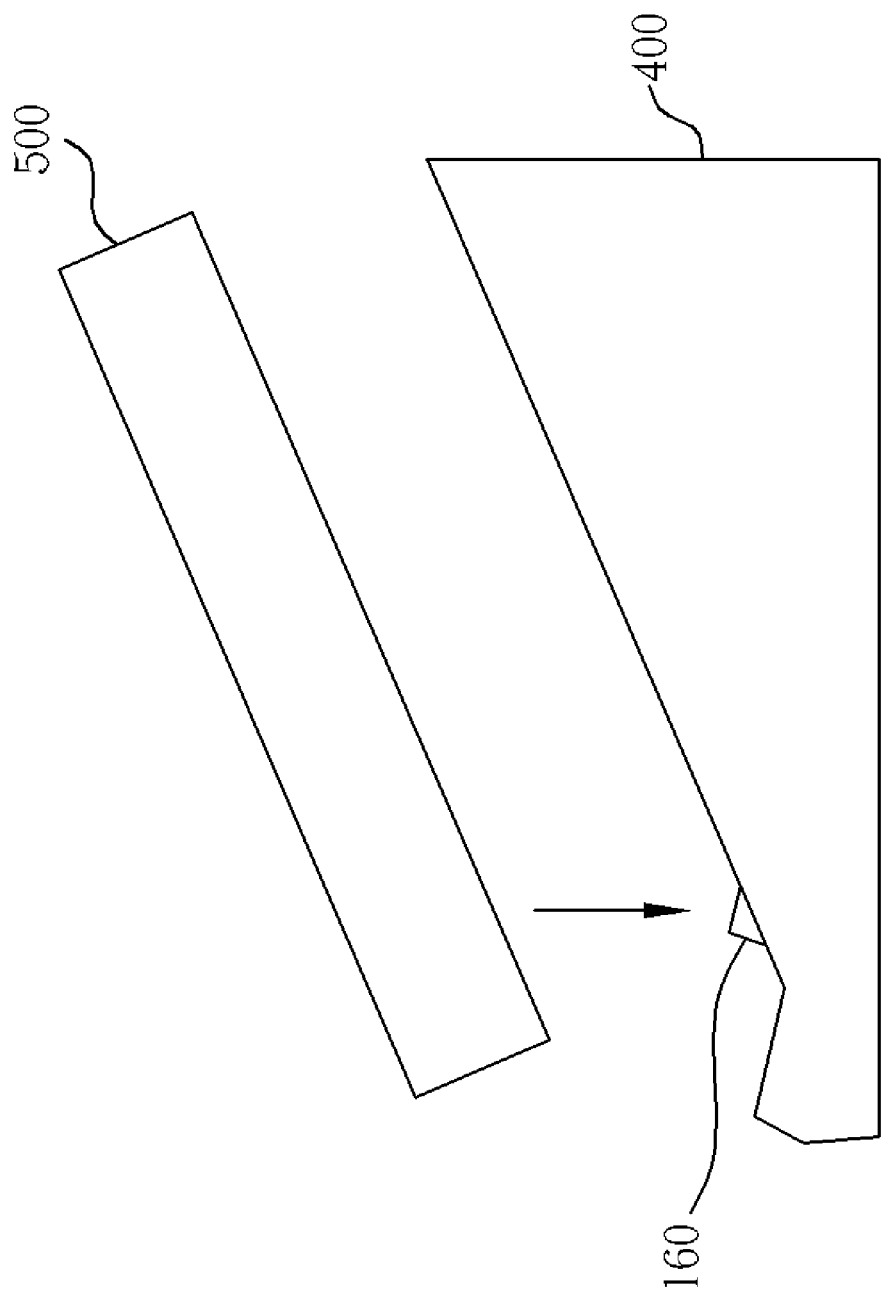
FIG. 9 shows an electronic device being placed directly over the elastic component according to the present invention.
Figure 10:
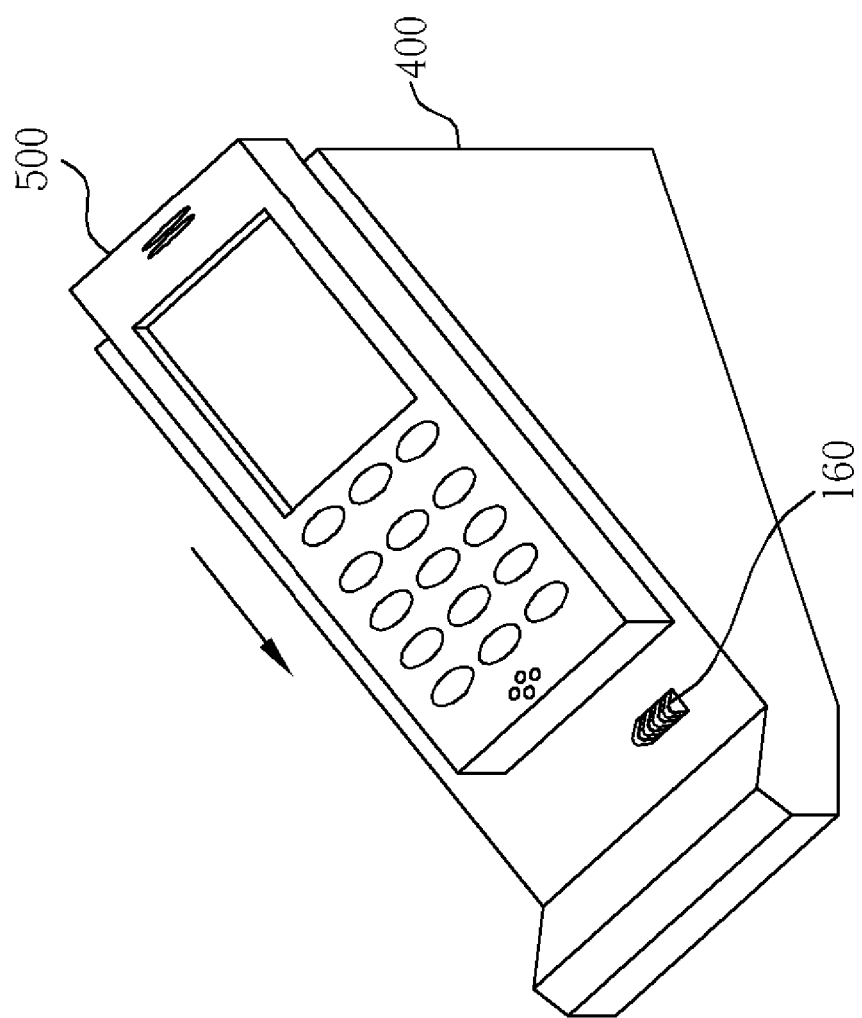
FIG. 10 shows an electronic device being moved downward along a surface of a cradle according to the present invention.

Please refer to FIG. 7. FIG. 7 shows the fingers 121-126 fixed inside a cradle 400, and only the curved contact regions 160 of the second segments 192 of the fingers 121-126 can be seen. Please refer to FIG. 2 and FIG. 8. While the device 500 is moved upward along the surface of the cradle 400 and passes over the fingers 121-126, the angles 175 between the first segments 190 and the second segments 192 of the fingers 121-126 expand, and the expansion and the relative alignment of the first segments 190 provide a spring action. Therefore, the device 500 can be moved over the fingers 121-126 smoothly and without catching. Please refer to FIG. 2 and FIG. 9. When the device 500 is placed into the cradle 400 from above, the second segments 192 of the fingers 121-126 are pressed closer to the first segments 190 and the first segments 190 bend about the first ends 130 also, and thereby the fingers 121-126 can make good electrical contact with the device. Please refer to FIG. 2 and FIG. 10. When the device 500 is moved downward along the surface of the cradle 400 and passes over the fingers 121-126, the first and second segments 190, 192 provide similar springing action. Thus, the device 500 can also be moved over the fingers 121-126 in this manner smoothly. In essence, the shape of the fingers 121-126 ensures that both inserting the device 500 into the cradle 400 and removing the device 500 from the cradle 400, from any direction, happens smoothly and with good making and breaking of electrical contact.

In summary, the present invention elastic component for electrically connecting the device with the cradle enables the user to freely put the device on the cradle from any direction without the device getting stuck and ensuring a good electrical connection. Furthermore, the two plates on the ends of the fingers make the elastic component more robust for the purposes of transportation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A conductive finger for electrically connecting an input node of an electronic device with an input node of a cradle comprising:
   a first end for being mechanically connected to the cradle;
   a first segment, spanning between the first end and a first point, the first segment comprising an S-bend, wherein none of convex or concave sides of the S-bend face an opposite side of the conductive finger; and
   a second segment, spanning between the first point and a second end, the second segment having a curved contact region for contacting the input node of the electronic device, an angle between a line connecting the first point and the first end and a line connecting the first point and the second end being an acute angle, a concave side of the curved contact region facing the first segment;
   wherein centerlines along the lengths of the first and second segments reside in a same plane.

2. The conductive finger of claim 1 wherein the first segment further comprises a bend between the S-bend and the first point, wherein the bend is of an obtuse angle.

3. The conductive finger of claim 2 wherein a concave side of the bend of the first segment faces the second segment.

4. The conductive finger of claim 2 wherein a concave side of the bend and the concave side of the curved contact region face inward toward an opposite side of the conductive finger.

5. The conductive finger of claim 1 wherein the acute angle is between 15 and 45 degrees.

6. The conductive finger of claim 1 wherein the first and second segments and have widths substantially perpendicular to the plane and have thicknesses substantially perpendicular to their respective widths, and a width-to-thickness ratio of the first and second segments is greater than 10 to 1.

7. The conductive finger of claim 1 being made of metal.

8. The conductive finger of claim 1 wherein the second segment further comprises a flat portion between the second end and the curved contact region for resting against an interior surface of the cradle.

9. A conductive elastic component for electrically connecting an electronic device with a cradle comprising:
   a plurality of conductive fingers, each conductive finger comprising:
      a first end for being mechanically connected to the cradle;
      a first segment, spanning between the first end and a first point, the first segment comprising an S-bend, wherein none of convex or concave sides of the S-bend face an opposite side of the conductive finger; and
      a second segment, spanning between the first point and a second end, the second segment having a curved contact region for contacting an input node of the electronic device, an angle between a line connecting the first point and the first end and a line connecting the first point and the second end being an acute angle, a concave side of the curved contact region facing the first segment, wherein centerlines along the lengths of the first and second segments reside in a same plane; and
   a first metallic plate connecting first ends of the plurality of conductive fingers; and
   a second metallic plate connecting second ends of the plurality of conductive fingers.

* * * * *